United States Patent
Trent

(10) Patent No.: US 6,578,629 B1
(45) Date of Patent: Jun. 17, 2003

(54) APPLICATION OF HEAT PIPE SCIENCE TO HEATING, REFRIGERATION AND AIR CONDITIONING SYSTEMS

(76) Inventor: Richard W. Trent, 2108 Lobolly La., Johns Island, SC (US) 29455

( * ) Notice: Subject to any disclaimer, the term of this patent is extended or adjusted under 35 U.S.C. 154(b) by 10 days.

(21) Appl. No.: 09/694,931

(22) Filed: Oct. 24, 2000

Related U.S. Application Data

(63) Continuation-in-part of application No. 09/222,139, filed on Dec. 29, 1998, now abandoned.
(60) Provisional application No. 60/071,801, filed on Jan. 20, 1998.

(51) Int. Cl.[7] .............................................. F28D 15/02
(52) U.S. Cl. .................. 165/274; 165/272; 165/104.14; 165/104.24; 165/104.13; 62/90
(58) Field of Search ................................ 165/272, 273, 165/274, 104.14, 104.24, 163, 104.13; 62/90

(56) References Cited

U.S. PATENT DOCUMENTS 4,549,403 A * 10/1985 Lord et al. ..................... 62/201
4,769,998 A * 9/1988 Oswalt et al. ................. 62/201

* cited by examiner

Primary Examiner—John K. Ford
(74) Attorney, Agent, or Firm—Edward P. Dutkiewicz

(57) ABSTRACT

An air conditioning system comprising a plurality of heat pipes. Each of the heat pipes includes an input coil at the input end of a chiller for the passage of input air there through and an output coil at the output end of a chiller for the passage of output air there through. Each of the heat pipes also having an inlet leg and an outlet leg coupling an associated input coil and output coil for the flow of a working fluid there through. At least one valve for controlling the flow of the coolant within each heat pipes exists. A tube and shell heat exchanger transfers heat from a chiller fluid to an intermediate portion of the heat pipes.

3 Claims, 1 Drawing Sheet

Figures 1, 2:
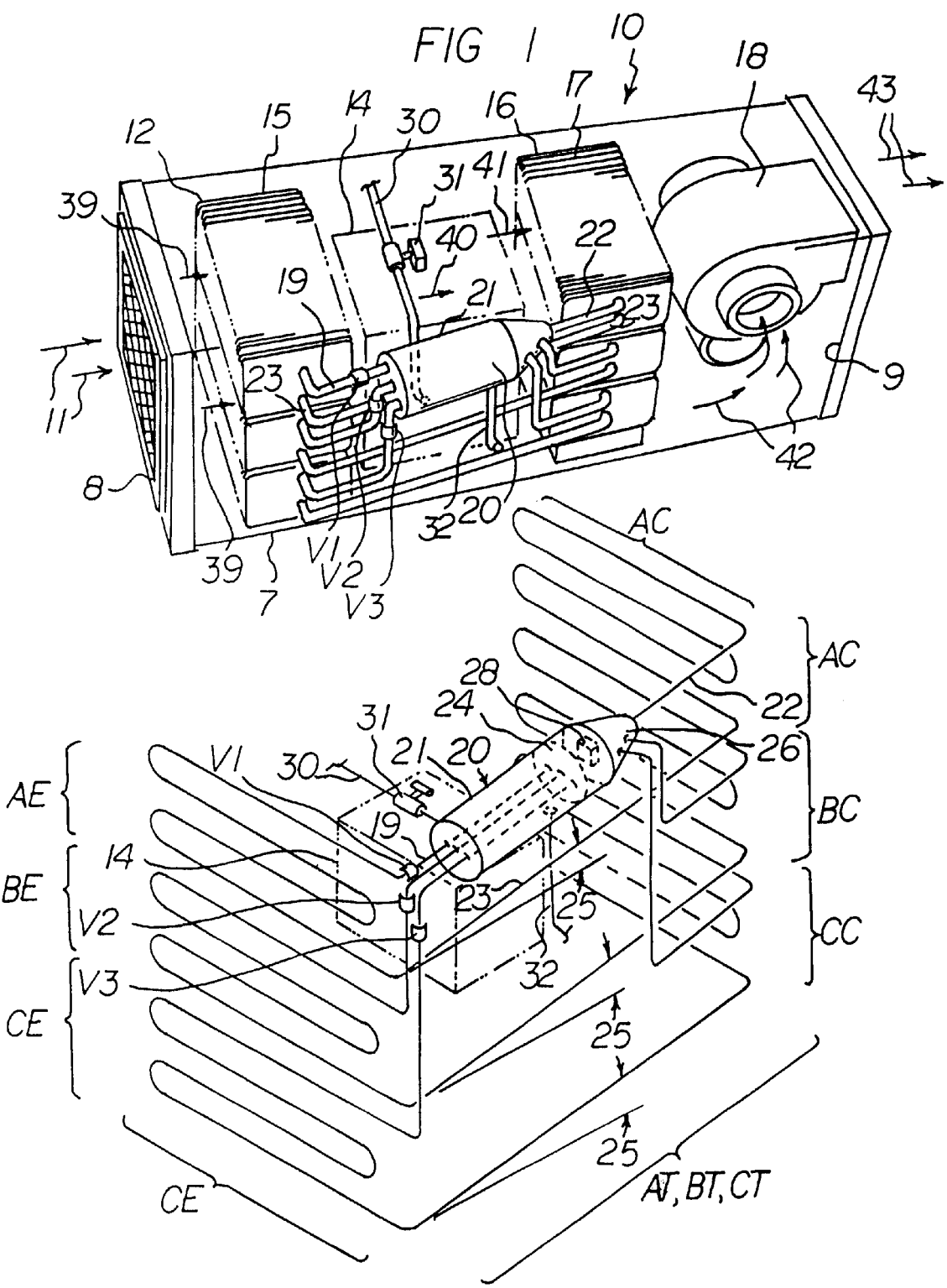

APPLICATION OF HEAT PIPE SCIENCE TO HEATING, REFRIGERATION AND AIR CONDITIONING SYSTEMS

This is a continuation in part of application Ser. No. 09/222,139 filed Dec. 29, 1998, now abandoned, which is a continuation of provisional application serial No. 60/071,801, filed Jan. 20, 1998.

FIELD OF THE INVENTION

The present invention is generally directed to a heat pipe apparatus and method used in heating, refrigeration, and air conditioning systems. More particularly, the present invention is directed to an apparatus and method employing a controllable heat pipe apparatus that provides a more energy efficient heating, refrigeration, and air conditioning systems.

BACKGROUND OF THE INVENTION

Air conditioning and heating systems generally require the transfer of heat to either cool or heat the air to a comfortable temperature. A heat pipe is one of the most efficient systems in use today for transferring heat. Heat pipes are vessels that contain a precise amount of a working fluid and have at least two sections, an evaporator section and a condenser section, that exchange heat with the environment external to the heat pipe. The evaporator section is disposed in thermal communication with an external heat source, while the condenser section is disposed in thermal communication with an external heat sink. Further, the heat pipe also has an adiabatic section that connects the evaporator section to the condenser section and through which heat is transferred within the heat pipe from the evaporator section to the condenser section.

Within the evaporator section of a heat pipe, the working fluid begins in its liquid state. As a heat source such as ambient hot air transfers heat by conduction through the heat pipe's external surfaces to the liquid that is the working fluid, the temperature of the liquid rises steadily commensurate with the provision of heat. This temperature rise continues until the temperature of the liquid attains the temperature at which the liquid evaporates to form the vapor state of the working fluid. At this vaporization temperature, the provision of additional heat to the liquid transforms the liquified working fluid into vaporized working fluid vapor pressure drives the vaporized working fluid through the adiabatic section to the condenser section of the heat pipe. At the condenser section, the vaporized working fluid transfers the heat absorbed in the evaporator section to the heat sink located at the condenser section of the heat pipe, thereby transforming the vaporized working fluid back into its liquid state. Capillary action and/or gravity return the liquified working fluid back to the evaporator section. The heat pipe continues the process of transferring heat as long as there is a temperature differential between the heat pipe's evaporator section and condenser section or a control technique interrupts the heat transfer process.

Controllable wrap around heat pipes that are installed, in air handlers of buildings are well-known. Some of these heat pipes use banks of individual tubes that can be tilted for control purposes. Still another type uses vertical tubes and headers with valving for control purposes. In these applications, the heat pipes are positioned such that the evaporator section is located amidst a heat source and the condenser section is amidst a heat sink.

However, known heat pipes are difficult to manufacture. The tilt-controlled heat pipes require the processing (evacuating and charging) of each individual tube. Sealing of the air passageways in the areas that the heat pipe tilts, is also difficult. In terms of performance, there are limitations to the length of the tubes to maintain desired capacities.

In the vertical tube/headered heat pipe, there are limitations to the vertical length of the tubes for performance. The manufacturing of such heat pipes requires precise spacing of the holes in the manifolds and numerous connections of the tubes into the manifold. Each connection of the tubes into the manifold requires a brazing operation. In addition, it is very difficult to align the headers of different sections within an evaporator or condenser section of a heat pipe.

Moreover, heat pipes that perform more efficiently are desired. Accordingly, a need currently exists for an improved heat pipe that overcomes manufacturing difficulties while enhancing performance for application to heating, refrigeration and air conditioning systems.

OBJECTS AND SUMMARY OF THE INVENTION

The present invention recognizes and addresses the foregoing disadvantages, and others of prior art constructions and methods. Accordingly, a primary object of the present invention is to provide an improved heat pipe apparatus suitable for controlling air temperature in heating, refrigeration, and air conditioning systems.

Another object of the present invention is to provide an improved, controllable, wrap-around heat pipe for controlling air temperature in heating, refrigeration, and air conditioning systems.

A further object of the present invention is to improve the efficiency of heat transfer within the adiabatic section of a heat pipe apparatus by providing a heat exchanger that controls the temperature of the working fluid within the adiabatic section of the heat pipe apparatus.

Yet another object of the present invention is to further improve the efficiency of an heat pipe apparatus and method for controlling air temperature in heating, refrigeration, and air conditioning systems by providing mechanisms for controlling the flow of fluids through the heat exchanger.

Still another object of the present invention is to provide a heat pipe apparatus for controlling air temperature in heating, refrigeration, and air conditioning systems without any height restriction for the tubes of the heat pipe. A still further object of the present invention is to provide a heat pipe apparatus for controlling air temperature in heating, refrigeration, and air conditioning systems, wherein the heat pipe employs longer continuous, machine formed tubes that require up to 75% fewer brazing operations and only one evacuation and charging process during manufacture of the heat pipe.

These and other objects of the present invention are achieved by providing a more energy efficient apparatus and method suitable for controlling air temperature in an air passage of air conditioning, refrigeration, and heating systems. The apparatus and method preferably employs a primary heat transfer unit and a secondary heat transfer unit. The primary heat transfer unit includes a primary fluid that functions as the working fluid flowing therein. The secondary heat transfer unit preferably employs a heat pipe that includes a secondary fluid that functions as the working fluid flowing therein.

In a presently preferred embodiment of the present invention, the heat pipe includes an evaporator section, a condenser section, and an adiabatic section, and the secondary fluid flows through each section. The condenser section and evaporator section of the heat pipe of the present invention are connected by at least one interconnected loop such that the secondary fluid can flow continuously throughout the system.

In one embodiment of the present invention, air flowing through the air passage of the apparatus thermally communicates with the heat pipe's evaporator section, which pre-cools the air before the air thermally communicates with a primary heat transfer unit in the form of a cooling unit. In the heat pipe's evaporator section, the secondary fluid is transformed into vapor and the vaporized secondary fluid flows to the condenser section through the adiabatic section. In the heat pipe's condenser section, vaporized secondary fluid is condensed back to its liquid state, thereby transferring most of the heat absorbed in the evaporator section to air that is thermally communicating with the condenser section.

In accordance with the present invention, an adiabatic section that connects the heat pipe's evaporator and condenser sections is specially configured and equipped to provide finer control over the amount and rate of heat transfer permitted to occur within the heat pipe. In one embodiment of the present invention, the adiabatic section is provided in the form of a shell-and-tube heat exchanger that is positioned between each pipe's evaporator section and condenser section. A primary coolant flows through the heat exchanger to affect the temperature of the secondary fluid flowing there through. In one air conditioning embodiment, the primary coolant is chilled water, and in another embodiment for heating systems the primary coolant is hot water.

Further control of the heat pipe is provided by primary and secondary flow control devices in accordance with the present invention. In one embodiment, a flow control valve is configured and disposed to control the flow of primary coolant (chilled water or hot water) into the shell-and-tube heat exchanger. In another embodiment, another flow control valve is configured and disposed to control the flow of secondary fluid within the shell-and-tube heat exchanger. The use of these flow control devices further enhances the performance of the adiabatic section of the pipe.

Other objects, features and aspects of the present invention are discussed in greater detail below.

BRIEF DESCRIPTION OF THE INVENTION

A full and enabling disclosure of the present invention, including the best mode thereof, to one of ordinary skill in the is set forth more particularly in the remainder of the specification, including reference to the accompanying figures, in which:

FIG. 1 is a schematic of a presently preferred embodiment of the invention that has been incorporated into a typical commercial air handler; and FIG. 2 is a schematic representation of the heat pipe features of the embodiment shown in FIG. 1.

Repeat use of reference characters in the present specification and drawings is intended to represent same or analogous features or elements of the invention

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction and operation.

In general, the present invention is directed to a controllable, wrap-around, heat pipe that provides the performance needed to make heating; refrigeration, and air conditioning systems more energy efficient at a more acceptable cost to consumers. In particular, the present invention provides for the modulation of heat transfer in the adiabatic section of the heat pipe.

Referring to FIGS. 1 and 2, the construction and operation of a presently preferred embodiment for an air conditioning system of the present invention now will be discussed. Other embodiments are also anticipated and are intended to be covered by this invention.

The apparatus of the present invention for controlling air temperature, comprises an air inlet, an air outlet, and an air passage located between the air inlet and the air outlet and providing a means for fluid to flow between the air inlet and the air outlet. As shown in FIG. 1, one embodiment of the present invention contains a housing 7 of an air handler. Housing 7 defines an air inlet 8, an air outlet 9, and an air passage 10 located between air inlet 8 and air outlet 9. A draw through blower 18 is configured and disposed relative to air passage 10 so as to be capable of operating to force air to flow through air passage 10 and in particular from air inlet 8 to air outlet 9.

Air entering air inlet 8 is schematically represented in FIG. 1 by the arrows designated by the number 11. Air entering blower 18 is schematically represented in FIG. 1 by the arrows designated by the number 42. Air leaving air outlet 9 is schematically represented in FIG. 1 by the arrows designated by the number 43.

In accordance with the present invention, a primary heat transfer unit is provided for regulating the temperature of air flowing through air passage 10. The primary heat transfer unit has at least one heat transfer component disposed within the air passage and in thermal communication with air flowing through the air passage. It is in this sense that the primary heat transfer unit is disposed within the air passage. However, the entire primary heat transfer unit can be disposed within air passage 10.

The primary heat transfer unit contains a primary fluid that functions as the working fluid carried by the primary heat transfer unit in thermal communication with air flowing through air passage 10. The primary fluid acts within the primary heat transfer unit's at least one heat transfer component that is in thermal communication with air flowing through the air passage.

As embodied herein and shown schematically in FIGS. 1 and 2, in one embodiment of the present invention, the primary heat transfer unit includes a conventional chilled water and/or DX coil, which is a direct expansion coil. The primary heat transfer unit is schematically represented in FIGS. 1 and 2 by the cube that is designated by the number 14. As is conventional with such chillers, the primary fluid is cold water, and in such direct expansion coils the primary fluid is refrigerant. Thus, the primary fluid is maintained at a temperature that is relatively lower than the temperature of the air entering air passage 10 via air inlet 8. Since persons of ordinary skill are familiar with cold water chillers, the details of their construction and operation are not essential to an understanding of the present invention.

In accordance with the present invention, a secondary heat transfer unit is provided for further regulating the temperature of air flowing through the air passage. The secondary heat transfer unit has at least one heat transfer component disposed within the air passage and in thermal communication with air flowing through the air passage. It is in this sense that the secondary heat transfer unit is disposed within the air passage However, the entire secondary heat transfer unit can be disposed within air passage 10.

The secondary heat transfer unit contains a secondary fluid that functions as the working fluid carried by the secondary heat transfer unit in thermal communication with air flowing through air passage 10. The secondary fluid acts within the secondary heat transfer unit's at least one heat transfer component that is in thermal communication with air flowing through the air passage.

As embodied herein and schematically shown in FIG. 2, the secondary heat transfer unit of the present invention includes a heat pipe. In general, a heat pipe of the present invention has at least two conducting sections in which the secondary fluid flows as the working fluid, which is also known as a refrigerant or coolant. The working fluid used in a heat pipe of the present invention can be any conventional coolant or refrigerant used in heat pipes. Preferably, as shown in FIG. 1, a heat pipe of the present invention has an evaporator section 12 and a condenser section 16 disposed in thermal communication with evaporator section 12.

The arrows designated by the number 39 in FIG. 1 are intended to schematically represent the air in air passage 10 that is in thermal communication with the secondary fluid that is carried by the evaporator section 12 of the secondary heat transfer unit. As shown in FIG. 1, a heat transfer portion of primary heat transfer unit 14 is positioned within air passage 10 between evaporator section 12 and condenser section 16 of the secondary heat transfer unit. Air in air passage 10 in thermal communication with the primary fluid that is carried by at least one heat transfer component of primary heat transfer unit 14 is schematically represented in FIG. 1 by the arrows designated by the number 40. Air in air passage 10 in thermal communication with the secondary fluid that is carried by the condenser section 16 of the secondary heat transfer unit is schematically represented in FIG. 1 by the arrows designated by the number 41.

As illustrated in FIG. 1, evaporator section 12 includes a plurality of aligned, parallel heat transfer fins 15 mounted on back-and-forth tubing that mayor may not have internal wicking and located at the heat source {which is an entering air stream schematically designated in FIG. 1 by the arrows labelled 39 in this example), designated as section AB (FIG. 2). A wickless heat pipe can also be referred to as a thermosiphon.

Condenser section 16 also includes a plurality of aligned, parallel heat transfer fins 17 mounted on back-and-forth tubing that mayor may not have internal wicking and located at the heat (which is a departing air stream schematically designated in FIG. 1 by the arrows labelled 41 in this example). The present invention is to provide a heat pipe apparatus for controlling air temperature in heating, refrigeration, and air conditioning systems without any height restriction for the tubes of the heat pipe.

A still further object of the present invention is to provide a heat pipe apparatus for controlling air temperature in heating, refrigeration, and air conditioning systems, wherein.

In accordance with the present invention, the heat pipe of the secondary heat transfer unit is configured with a geometry that permits its manufacture with relatively longer, continuous, machine formed tubes. So configured, manufacture of the heat pipe of the present invention can be accomplished with much fewer brazing operations than with conventional heat pipe configurations. Moreover, the geometry of the heat pipe of the present invention is so configured, so that during its manufacture it is necessary to undergo only one evacuation and charging process.

As embodied herein and shown in FIG. 2 for example; the geometry of the heat pipe forming the secondary heat transfer unit can include a plurality of vertically stacked; interconnected loops employing relatively longer, continuous tubes. Indeed, the geometry of the heat pipe of the present invention does not impose any height restriction on the tubes. In the illustrative embodiment shown in FIG. 2, evaporator section 12 and condenser section 16 contain three vertically stacked interconnected heat pipe loops, which are respectively designated by the letters A, B, and C. The number of vertically stacked interconnected heat pipe loops in any given embodiment of the present invention is not limited to three. But three have been chosen as sufficient to demonstrate the multi-loop configuration of embodiments of the present invention.

Each heat pipe loop A, B, C, includes respectively, an evaporator section AE, BE and CE; a condenser section AC, BC and CC; and a transfer section AT, BT, CT that respectively connects each evaporator section AE, BE and CE to each condenser section AC, BC-and cc. To avoid crowding the drawing, each transfer section AT, BT and CT is labeled only near the bottom of FIG. 2. For the sake of simplification, in the remainder of this explanation, only heat pipe loop A will be discussed in any detail. The other loops B and C are constructed and operate in the same way as Loop A.

In accordance with the present invention, the adiabatic heat transfer section of the heat pipe forming the secondary heat transfer unit forms part of a heat exchanger vessel that is configured and disposed between and in fluid communication with the evaporator section and the condenser section of the secondary heat transfer unit. The heat exchanger vessel contains a working fluid for effecting heat transfer. The working fluid of the heat exchanger vessel is known as the primary coolant. Moreover, the heat exchanger vessel is configured so that the secondary fluid of the secondary heat transfer unit is in thermal communication with the primary coolant of the heat exchanger vessel.

As embodied herein and shown in FIG. 1 for example, the heat exchanger vessel can be provided in the form of a shell-and-tube heat exchanger 20 having its heat transfer portions disposed within housing 7 of the air handler. In the shell-and-tube heat exchanger 20, an external source of cooling or heating is introduced either on the shell side or the tube side in a controlled manner to enhance the heat pipe performance in the adiabatic transfer section. In the embodiment shown in FIGS. 1 and 2, the primary coolant provides the external source of cooling or heating and is introduced via a conduit 30 on the shell side of heat exchanger 20. The shell side of heat exchanger 20 is formed by a cooling chamber 21. The heat pipe's adiabatic transfer section located between evaporator section 12 and condenser section 16 forms the tube side of heat exchanger 20 and permits the primary coolant to modulate the heat transfer process during the movement of the secondary fluid through the adiabatic transfer section of the heat pipe, which forms the secondary heat transfer unit.

In some embodiments, the primary coolant and the primary fluid are derived from different bodies of fluid. However, in other embodiments, the primary coolant and the primary fluid are derived from the same body of fluid, but at different stages of the flow circuit. For example, the primary coolant is provided by the primary fluid after the primary fluid has been exposed to thermal communication with the air passing through the primary heat transfer unit. Thus, in the embodiment shown in FIGS. 1 and 2, the primary coolant flowing through inlet piping 30 is diverted from the flow of primary fluid through chiller 14, and the primary coolant flowing through outlet piping 32 is returned to the flow of primary fluid through chiller 14.

As shown in FIGS. 1 and 2, evaporator section loop AE is preferably connected in a continuous loop to condenser section AC by an adiabatic section AT that provides a path for the secondary fluid to pass through the shell-and-tube heat exchanger 20. As shown in FIG. 2 for loop At the adiabatic section includes a run of tubing that includes an inlet leg 19 that provides a path for the secondary fluid to enter and pass through cooling chamber 21 of shell-and-tube heat exchanger vessel 20. Cooling chamber 21 forms the shell side of exchanger 20, and inlet leg 19 forms one of the tubes of the tube side of exchanger 20. The adiabatic section also includes a discharge plenum 24 and a vapor header 26 of exchanger 20. Inlet leg 19 is connected to discharge plenum 24, which in turn is connected to vapor header 26 of exchanger 20. The adiabatic transfer section also includes an outlet leg 22 that is connected to vapor header 26 and that provides a path for the secondary fluid to leave exchanger vessel 20.

The secondary fluid returns to evaporator section loop AB from condenser section AC by return tubing 23 that connects condenser section 16 and evaporator section 12 of the secondary heat transfer unit. In some embodiments, the condenser section AC of the heat pipe is positioned at an incline above the evaporator section AB of the heat pipe such that gravity forces the condensed secondary fluid to flow from the condenser section to the evaporator section. In FIG. 2, the arrows designated 25 are meant to schematically indicate the angle of the downward incline of secondary fluid return 23. This downward incline of return 23 enables the force of gravity to enhance the flow of secondary fluid toward evaporator section 12. It should be understood that a downward incline may not be required in all applications.

According to the present invention, control mechanisms can be used to further enhance the performance of the secondary heat transfer unit, and thus of the system employing same. In general, one or more control valves can be positioned in various strategic locations to control the flow of the various working fluids between each heat conducting section. In accordance with the present invention, a primary flow control device is configured and disposed for controlling the flow of the primary -coolant through the heat exchanger vessel. In one application of the embodiment shown in FIGS. 1 and 2 chilled water enters the shell side of shell-and-tube heat exchanger 20 via inlet piping 30 and leaves the shell side at the bottom of the cooling chamber 21 of exchanger 20 via outlet piping 32. A primary flow control device, which can be provided in the form of a solenoid valve 31 for example, regulates this flow of chilled water, the primary coolant, into shell-and-tube heat exchanger 20. Thus, valve 31 in effect controls the amount of heat transferred by the primary coolant to the secondary fluid. Consequently, valve 31 controls the amount of transferred by the secondary fluid to the air that thermally communicates with condenser section 16, thus providing enhanced efficiency for the heat pipe and the air conditioning system as a whole.

In accordance with the present invention, a secondary flow control device is configured and disposed to control the flow of the secondary fluid between the evaporator section and the condenser section of the secondary heat transfer unit. As shown schematically in FIG. 2, a secondary flow control device is provided by a control valve 28 that is located between discharge plenum 24 and vapor header 26 of exchanger 20. Thus secondary flow control device is located within the heat exchanger vessel 20. As shown in FIG. 2, valve 28 desirably can be provided in the form of a solenoid valve and generally regulates the flow of the secondary fluid through the shell-and-heat exchanger to more efficiently control the amount of heat transferred by the secondary fluid to the air that thermally communicates with condenser section 16.

Preferably, the operation of control valves 28 and 31 are performed remotely and automatically as an integral part of the control system of the heating, refrigeration, or air conditioning system being served.

The interaction of the preferred embodiment of a heat pipe apparatus of the present invention in an air handler that furnishes conditioned air to a space, is described as follows As schematically shown in FIG. 1, air 11 is generally comprised of warm air from outside, return air from the space served, or a combination thereof. Air 11 enters housing 7 of an air handler via a filter F and transfers heat to the evaporator section 12. Heat is absorbed by the secondary fluid within evaporator section 12 as it contacts air 11. This absorption of heat from the air 11 by the working secondary fluid causes air 11 to be precooled, it is this precooled air that enters cooling coil 14 (chilled water or DX evaporator coil). This precooling step makes cooling coil 14 more effective by lowering the temperature of air 40 to near the dew point (and sometimes beyond), thus reducing the amount of energy needed by cooling coil 14 to cool the air 40 that comes into thermal communication with the primary fluid flowing in cooling coil 14. The air 41 leaving the cooling coil 14 is at or near saturation. Air 41 then enters and passes through condenser section 16 of the heat pipe, and heat is transferred from condenser section to the air 41. Thus, some of the heat that was absorbed by the secondary fluid in evaporator section 12 is transferred to air 41 as air 41 flows through condenser section 16. Air 42 that leaves the condenser section 16 has been reheated by the secondary fluid to reduce the relative humidity of supply air 42 without requiring further energy from some other external energy source. As such, supply air 42 is distributed via ducts by blower 18 at reduced humidity and at a more comfortable temperature to the various spaces being served by the air handler. The heat transfer process is enhanced or retarded by the control mechanisms described above and labelled as valves 28 and 31.

In the preferred embodiment of the invention, an air conditioning system 10 is provided for utilizing heat pipes to maximize the efficiency of air cooling. The system comprises, in combination, a chiller 14 with an input end adapted to receive input air to be cooled and an output end adapted to discharge cooled air for movement into a chamber. Therewith, an associated fan 18 functions to cause the flow of air through the chiller. The chiller has a fluid to cause cooling of the chiller. Next provided are a plurality of heat pipes A, B, C which include an upper heat pipe and a lower heat pipe and an intermediate heat pipe there between. Each of the heat pipes including an input coil in a serpentine configuration at the input end of the chiller for the passage of input air there through and an output coil in a serpentine configuration at the output end of the chiller for the passage of output air there through. Each of the heat pipes also having an inlet leg 19 and an outlet leg 22 coupling an associated input coil and output coil for the flow of a working fluid there through in a continuing cycle of operation. A separate valve V1, V2, V3 for each inlet leg controls the flow of the coolant within each heat pipe. Lastly, a shell and tube heat exchanger 20 is provided having a first zone 21 with an inlet adapted to receive the flow of coolant from each inlet leg of each heat pipe with lines to direct the flow of fluid associated with the chiller to cool the coolant and a second zone 26 to intermix the coolant. The second zone also has a supplemental valve 28 to control the flow of coolant with an outlet to discharge the flow of coolant to an outlet leg of each heat pipe. Such supplemental valve may be used as a substitute for the separate valves or in addition there to. Such supplemental valve may control the flow of coolant en masse or the flow through the individual legs.

In a typical operating embodiment, the air to the system may be between about 75 and 95 degrees Fahrenheit while the air from the system may be between about 66 and 70 degrees Fahrenheit. The input coils function to drop the air temperature by between about 10 and 12 degrees Fahrenheit while the output coils function to raise the air temperature by between about 10 and 12 degrees Fahrenheit. The flow of fluid through the heat exchanger is initially at about 43 or 44 degrees Fahrenheit and functions to cool the coolant in the lines in the heat exchanger whereby the vapor is boiled.

By taking a new look at the circuitry and devising one that overcomes manufacturing obstacles while enhancing performance, we believe we have created a new generation of heat pipes that will outperform the heat pipe heat exchangers currently on the market. A search of the literature suggests our circuitry is indeed unique and may be patentable. In which case we should be able to develop a complete line using this concept and with proper registration be protected from exact or near duplication by another entity during the life of a U.S. granted patent and patent pending application.

The unique features of this design are:

1. Circuitry vapor lines into a shell and tube heat exchanger pressure vessel that function as a handler supply from the evaporator to the condenser.

2. The shell and tube heat exchanger is intended to offer supplementary vapor cooling en route to the condenser to accelerate the change of state process and, hence, the heat transfer process. The source of cooling energy being the already available chill water in the chill water coil with heat pipes positioned in the air stream both before and after the chill water coil normally associated with an air handling unit.

3. Also provided are two means of controlling the heat transfer process, valve in the vapor header and a valve in the chill water circuit. The operation of both valves would be made a part of a HVAC control system.

Some Advantages:

1. Longer heat pipe assemblies—Fin height is no longer a critical factor and more conventional finned tubes can be effectively used.

2. More volume in tubes in evaporator heat pipe.

3. No big migration when system is off or very low changes of temperature.

4. C.W. can be used to increase the latent cooling/reheat available without extra fan load.

5. Supplementary reheat during cooling season or may be entirely eliminated.

6. Total chiller system efficiency may be improved.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. An air conditioning system for utilizing heat pipes to maximize the efficiency of air cooling, comprising, in combination:

a chiller with an input end adapted to receive input air to be cooled and an output end adapted to discharge cooled air for movement into a chamber with an associated fan to cause the flow of air through the chiller, the chiller having a fluid to cause cooling of the chiller;

a plurality of heat pipes including an upper heat pipe and a lower heat pipe and an intermediate heat pipe there between, each of the heat pipes including an input coil in a serpentine configuration at the input end of the chiller for the passage of input air there through and an output coil in a serpentine configuration at the output end of the chiller for the passage of output air there through, each of the heat pipes also having an inlet leg and an outlet leg coupling an associated input coil and output coil for the flow of a working fluid there through in a continuing cycle of operation;

a separate valve for each inlet leg for controlling the flow of the coolant within each heat pipe; and a shell and tube heat exchanger having a first zone with an inlet adapted to receive the flow of coolant from each inlet leg of each heat pipe with lines to direct the flow of fluid associated with the chiller to cool the coolant and a second zone to intermix the coolant, the second zone also having supplemental valve to control the flow of coolant with an outlet to discharge the flow of coolant to an outlet leg of each heat pipe.

2. An air conditioning system, comprising:

a plurality of heat pipes, each of the heat pipes including an input coil at the input end of a chiller for the passage of input air there through and an output coil at the output end of a chiller for the passage of output air there through, each of the heat pipes also having an inlet leg and an outlet leg coupling an associated input coil and output coil for the flow of a working fluid there through;

at least one valve for controlling the flow of the coolant within each of the heat pipes;

a shell and tube heat exchanger having a first zone with an inlet adapted to receive the flow of coolant from each inlet leg of each heat pipe with lines to direct the flow of fluid associated with the chiller to cool the coolant; and a second zone in the shell and tube heat exchanger to intermix the coolant and with an outlet to discharge the flow of coolant to an outlet leg of each heat pipe.

3. An air conditioning system as described in claim 2 wherein the system further comprises:

a supplemental valve in the second zone to control the flow of coolant.

* * * * *